United States Patent
Lin et al.

(10) Patent No.: US 7,284,080 B2
(45) Date of Patent: Oct. 16, 2007

(54) MEMORY BUS ASSIGNMENT FOR FUNCTIONAL DEVICES IN AN AUDIO/VIDEO SIGNAL PROCESSING SYSTEM

(75) Inventors: Chin-Long Lin, San Jose, CA (US); Ren-Yuh Wang, Cupertino, CA (US)

(73) Assignee: Sigmatel, Inc., Austin, TX (US)

( * ) Notice: Subject to any disclaimer, the term of this patent is extended or adjusted under 35 U.S.C. 154(b) by 231 days.

(21) Appl. No.: 10/614,676

(22) Filed: Jul. 4, 2003

(65) Prior Publication Data

US 2005/0005050 A1    Jan. 6, 2005

(51) Int. Cl.
G06F 13/14    (2006.01)
G06F 13/38    (2006.01)
G06F 13/372    (2006.01)
G06F 12/00    (2006.01)

(52) U.S. Cl. ...................... 710/244; 710/116
(58) Field of Classification Search ............... 710/107, 710/113, 116, 117, 240–241, 244
See application file for complete search history.

(56) References Cited

U.S. PATENT DOCUMENTS

| | | | |
|---|---|---|---|
| 5,083,261 A * | 1/1992 | Wilkie | 710/265 |
| 5,257,357 A * | 10/1993 | Yishay et al. | 710/269 |
| 5,802,330 A * | 9/1998 | Dutton | 710/116 |
| 5,862,355 A * | 1/1999 | Logsdon | 710/116 |
| 5,884,051 A * | 3/1999 | Schaffer et al. | 710/107 |
| 5,931,924 A * | 8/1999 | Arimilli et al. | 710/41 |
| 5,956,493 A * | 9/1999 | Hewitt et al. | 710/113 |
| 6,092,137 A * | 7/2000 | Huang et al. | 710/111 |
| 6,226,702 B1 * | 5/2001 | Yakashiro | 710/107 |

* cited by examiner

*Primary Examiner*—Paul R. Myers
*Assistant Examiner*—Ryan M Stiglic
(74) *Attorney, Agent, or Firm*—Toler Schaffer LLP (57) ABSTRACT

The invention provides a system and method for memory bus assignment for a plurality of functional devices. According to a preferred embodiment, the invention provides a system comprising a plurality of functional devices accessing a memory bus wherein the memory bus allows access by one of the functional devices for one cycle of period of time, a plurality of request agents corresponding to the functional devices, a control register respectively storing access priority grades for the request agents, a plurality of counter timers respectively loading the access priority grades; and a bus elector coupled with the counter timers wherein the bus elector respectively compares the loaded access priority grades and elects one out of the request agents according to the compared access priority grades. The memory bus accordingly allows access by one of the functional devices corresponding to the elected request agent for one cycle of period of time.

20 Claims, 4 Drawing Sheets

MEMORY BUS ASSIGNMENT FOR FUNCTIONAL DEVICES IN AN AUDIO/VIDEO SIGNAL PROCESSING SYSTEM

BACKGROUND OF THE INVENTION

1. Field of the Invention

The present invention generally relates to audio/video signal processing and, more particularly, to memory bus assignment to various functional devices in an audio/video signal processing system.

2. Description of the Related Art

In an audio/video (A/V) signal processing system (e.g., an MPEG codec (coder-decoder)), processed A/V signals at various functional devices therein compete for processing attention in the system. As the various types of A/V signals are processed, they need to be attended to in the system memory block for signal processing, e.g., compression, decompression, and resolution of motion estimation vectors. A plurality of functional devices compete for control and access over the memory bus in the codec system so as to transfer the appropriate A/V data into and out of the memory blocks.

Fixed memory bus arbitration methodologies in a conventional A/V signal processing system employ even distribution of memory resources among the competing functional devices. However, data processing for the various functional devices typical in an A/V signal processing system (such as codecs for MPEG applications) poses varying processing requirements. Poor management of the memory resource assignment among the functional devices of an A/V signal processing system results in reduced overall system performance. Moreover, video display may become sluggish and appear less than smooth for visual viewing. Measures such as improved processing power may improve system performance but are resource-intensive and cost-prohibitive.

There is therefore a general need in the art for an optimal method and device for memory bus assignment to various functional devices in an audio/video signal processing system. A particular need exists in the art for an arbiter device for controlling memory bus assignment in audio/video signal processing systems that optimally provides prioritized access to functional devices in the system for memory resource access based on preset priorities. There is a further need in the art for an arbiter device for controlling memory bus assignment in audio/video signal processing systems that dynamically provides prioritized access to functional devices of the system for memory resource access according to changing operational requirements.

SUMMARY OF THE INVENTION

The invention provides a system and method for memory bus assignment for a plurality of functional devices. According to a preferred embodiment, the invention provides a system comprising a plurality of functional devices accessing a memory bus wherein the memory bus allows access by one of the functional devices for one cycle of period of time, a plurality of request agents corresponding to the functional devices, a control register respectively storing access priority grades for the request agents, a plurality of counter timers respectively loading the access priority grades; and a bus elector coupled with the counter timers wherein the bus elector respectively compares the loaded access priority grades and elects one out of the request agents according to the compared access priority grades. The memory bus accordingly allows access by one of the functional devices corresponding to the elected request agent for one cycle of period of time.

The invention also provides a method for a system having a plurality of functional devices accessing a memory bus. According to this particular embodiment, the method according to the invention comprises the steps of providing a plurality of request agents respectively corresponding to the functional devices, storing access priority grades for the request agents, comparing the access priority grades, electing a request agent out of the request agents according to the compared access priority grades, and allowing access to the memory bus for one cycle of period of time by one of the functional devices corresponding to the elected request agent to the memory bus.

According to a further embodiment, the invention provides an arbitration controller for determining memory bus assignment for a plurality of functional devices in an audio/video signal processing system in response to access requests. The functional devices in this particular embodiment include memory controllers, image processors, motion estimation processors, host or peripheral interfaces. The arbitration controller accordingly comprises an agent array, a control register, and an arbiter. The agent array further comprises a plurality of request agents, where the request agents respectively represent corresponding functional devices in the system for raising agent requests for access to the memory bus. The control register stores for each of the functional devices a corresponding priority control parameter representing the access priority to the memory bus. The arbiter further comprises a control unit, a counter array having a plurality of counter timers and a bus elector. The control unit is connected to each of the request agents for receiving the corresponding agent requests. Each of the counter timers is connected to the control register for loading the priority control parameters corresponding to the functional devices for submitting to a repeating counting cycle upon reception of the corresponding agent requests. The bus elector compares, for each of the repeated counting cycles, all the counter values in the counter timers for electing one of the request agents corresponding to the functional devices as the elected request agent corresponding to the results of the comparison. The functional device corresponding to the elected request agent is then allowed access to the memory bus for one cycle of period of time.

BRIEF DESCRIPTION OF THE DRAWINGS

Other features and advantages of the present invention will become apparent by way of the following detailed description of the preferred but non-limiting embodiments. The description is made with reference to the accompanied drawings (not necessarily drawn to scale) in which.

DETAILED DESCRIPTION OF THE PREFERRED EMBODIMENTS

Figure 1:
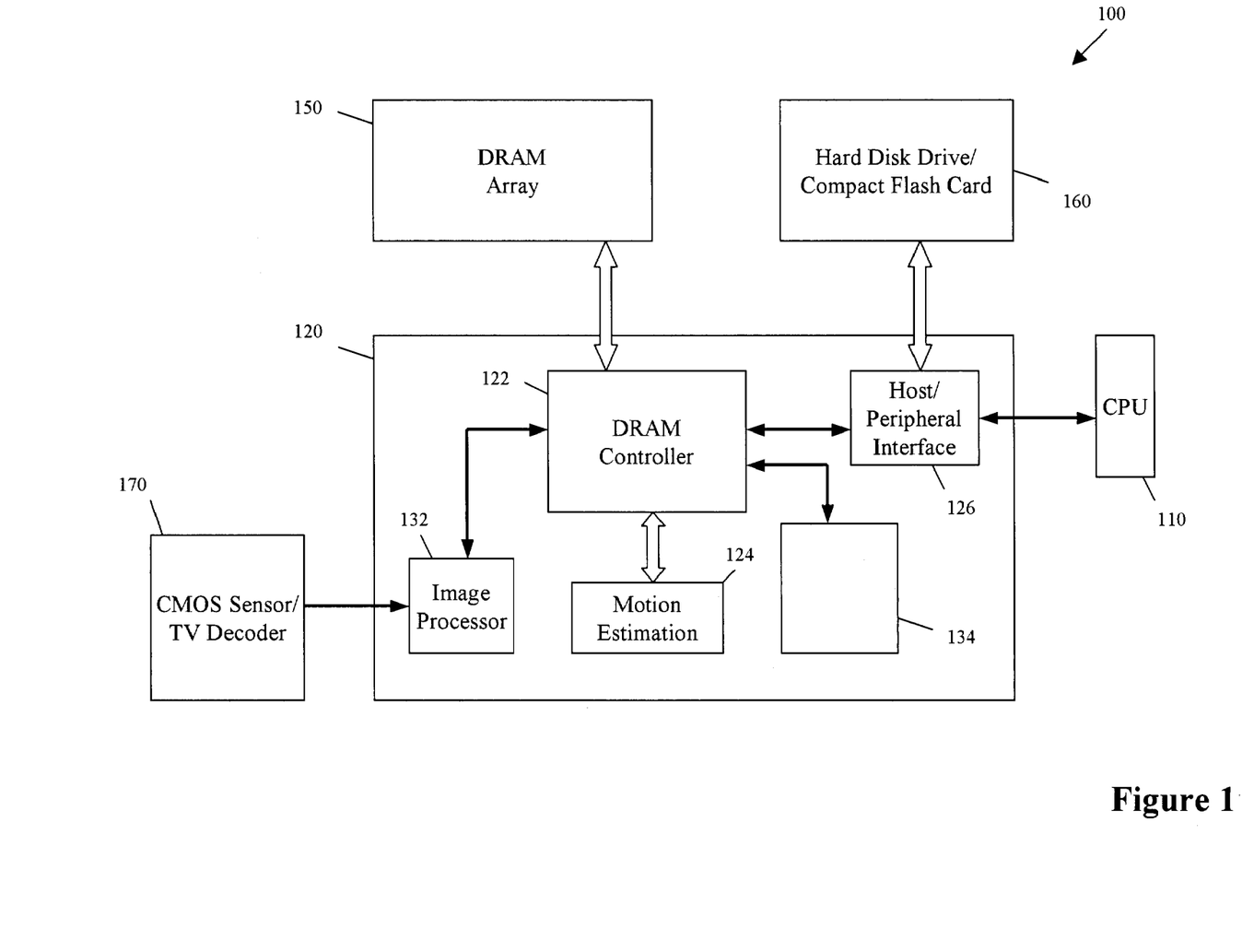
FIG. 1 is a block diagram generally illustrating the circuit configuration of an audio/video signal processing system according to the invention.

FIG. 1 is a block diagram that generally illustrates the circuit configuration of an audio/video (A/V) signal processing system 100 in accordance with the invention. According to this embodiment, the system 100 comprises an MPEG code processor 120 connected to a central processing unit (CPU 110), a decoder 170, a DRAM (dynamic random access memory) array 150 and a storage device 160 (such as a hard disk drive or a compact flash card). The MPEG code processor 120 further comprises an image processor 132 (connected to the decoder 170), a DRAM controller 122, a host or peripheral interface 126 (connected to the CPU 110), a motion estimation processor 124 processing video information 134 compressed in discrete cosine transform (DCT), inverse discrete cosine transform (IDCT) or variable length coding (VLC). A typical A/V signal processing system such as one for MPEG codec applications requires the incorporation of a memory bus arbiter for managing the assignment of the access right to the system memory resources among various signal processing operations performed by various functional devices in the system.

The system 100 of FIG. 1, e.g., an MPEG2 or MPEG4 video device, which is based on an MPEG Codec Processor 120, may need to run signal encoding in order to compress the video information picked up by its CMOS Sensor/TV Decoder 170 and store the compressed information in the storage device 160. The Image Processor 132 processes the image information produced by Sensor/Decoder 170. In order to implement this, the Image Processor 132 needs to have access to the DRAM Array 150 of the system as it works on a large amount of image data.

When the system 100 is decoding a video information retrieved from the storage device 160 in a particular video format (such as MPEG2 or MPEG4), the system needs to implement motion estimation processing on the compressed video information involving schemes such as DCT, IDCT or VLC. The motion estimation processing by the Motion Estimation Processor 124 also requires access to the System Memory Array 150.

A/V processing operations in the system 100 involve accessing the system memory block 150 by various resources therein, under the overall control of the DRAM Controller 122. The memory bus arbiter, not shown in the block diagram of FIG. 1, which is an integral component of the DRAM Controller 122, is responsible for the optimized control of the assignment of the memory resource to the functional devices in the system 100. The CPU 110 governs the A/V encoding and decoding through a Host/Peripheral Interface 126. The interface 126 is also responsible for providing interface between the functional devices of the Codec Processor 120 and the system storage device 160 (e.g., hard disk or flash card).

Figure 2:
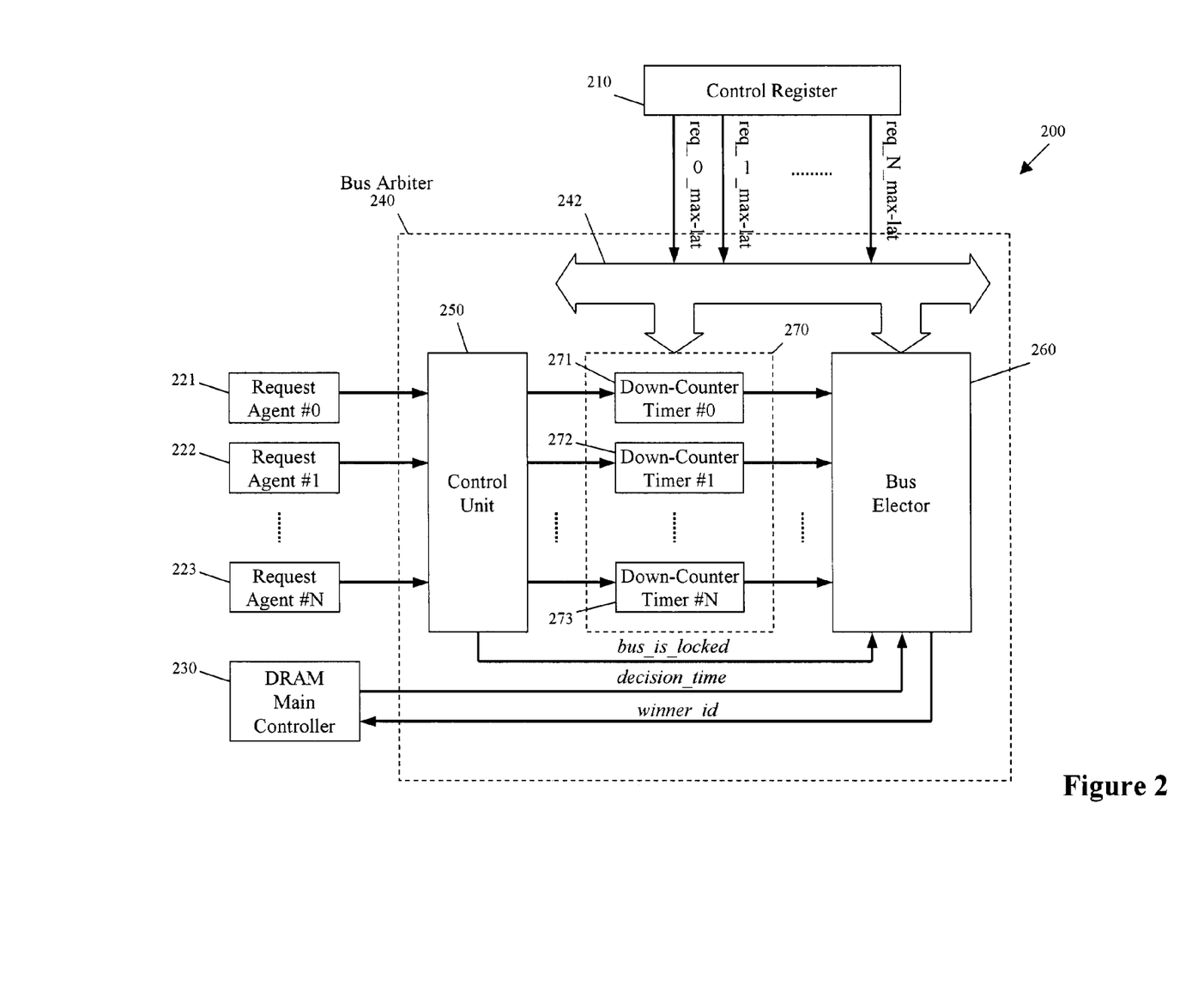
FIG. 2 is a block diagram illustrating the functional circuit configuration of a memory bus arbitration controller in accordance with a preferred embodiment of the present invention.

FIG. 2 is a block diagram illustrating the functional circuit configuration of a memory bus arbitration controller 200 in accordance with a preferred embodiment of the present invention. The invention provides a system and method for memory bus assignment for a plurality of functional devices. According to a preferred embodiment, the invention provides a system comprising a plurality of functional devices accessing a memory bus wherein the memory bus allows access by one of the functional devices for one cycle of period of time, a plurality of request agents (0, 1, 2, 3 . . . N) corresponding to the functional devices, a control register 210 respectively storing access priority grades for the request agents, a plurality of counter timers (0, 1, 2, 3 . . . N) respectively loading the access priority grades; and a bus elector 260 coupled with the counter timers (0, 1, 2, 3 . . . N) wherein the bus elector 260 respectively compares the loaded access priority grades and elects one out of the request agents according to the compared access priority grades. The memory bus accordingly allows access by one of the functional devices corresponding to the elected request agent for one cycle of period of time.

The invention also provides a method for a system having a plurality of functional devices accessing a memory bus. According to this particular embodiment, the method according to the invention comprises the steps of providing a plurality of request agents (0, 1, 2, 3 . . . N) respectively corresponding to the functional devices, storing access priority grades for the request agents (0, 1, 2, 3 . . . N), comparing the access priority grades, electing a request agent out of the request agents according to the compared access priority grades, and allowing access to the memory bus for one cycle of period of time by one of the functional devices corresponding to the elected request agent to the memory bus.

The Arbiter 240, generally identified in FIG. 2 by the section enclosed by phantom line, receives memory bus access requests from various system functional devices, as represented by Request Agent #0, #1, . . . and #N, identified by reference numerals 221, 222, . . . and 223 respectively. Note that each of the Request Agents 221, 222, . . . and 223 may represent one of the functional devices in the Codec Processor 120 of FIG. 1, such as the Image Processor 132, the Motion Estimation Processor 124, or the Host/Peripheral Interface 126 respectively.

A Control Register 210, which holds a set of pre-determined control parameters, feeds the basic (and initial) information for managerial control of the bus arbitration operation of the Arbiter 240. A DRAM Main Controller 230, in general, represents the rest of the logic functional circuitry of the DRAM controller of the A/V signal processing system other than the arbitration control logic itself.

As the A/V signal processing system operates to perform various A/V processing functions, each functional circuit components of the system competes with others for the control over the memory bus in order to access the system main memory block. This is because that many of the various A/V processing schemes involve certain mathematical algorithms, either simple or complex, that require the intensive use of system memory for the storage of intermediate data. Thus, each and everyone of these functional devices in the system issues its own memory access request via its representing Request Agent, i.e., one of Agents 221, 222, . . . and 223.

Typically, each processing function has a different weight of importance, or, priority, in an optimized A/V signal processing system. The relative importance of a processing function as compared to another is translated into priority grading in the system. In general, requests bearing higher priorities should have the right to have relatively easier (or faster) and longer access to the memory bus in order that the A/V signal processing system may operate in an optimized manner. To ensure this optimization, the Control Register 210 of the Arbitration Controller 200 is responsible for holding and maintaining the priority information for each and every Request Agent. A pre-determined set of priority grades can be preset in the Control Register 210. These priorities, however, may also be adjusted dynamically on-the-fly as the overall operating condition of the A/V signal processing system is altered to suit the need for different A/V processing functions.

In a preferred embodiment, the Control Register 210 holds and maintains a set of priority grading information req_0_max-lat, req_1_max-lat, . . . and req_N_max-lat for each of the functional devices behind the Request Agents 221, 222, . . . and 223 respectively. Each priority grading information represents, and can be employed as, a value for a maximum latency count that is used as the initial count down value in a preferred embodiment of the present invention. Such an implementation employs down counters in the scheme of determining the winner for access to the system memory bus.

Note, however, that, as is comprehensible for those in the art, the counting scheme for resolving the selection of a bus winner from among the competing resources may also be a count-up scheme rather than the countdown one described here. In a count-up scheme, the count may start from nil and the logic checks to see if a preset counter value is reached. This check may be implemented by comparing the counter value with the preset value. An equality flag signals the counter achievement similar to the counting down to nil in a countdown scheme.

Thus, as the A/V signal processing system is initialized at reset, all priority grading information req_0_max-lat, req_1_max-lat, . . . and req_N_max-lat for each of the functional devices behind the Request Agents 221, 222, . . . and 223 respectively are set to their respective pre-selected initial value. This involves loading each of the information req_0_max-lat, req_1_max-lat, . . . and req_N_max-lat via the Control Bus 242 into its respective down-counter timer, namely Down-Counter Timer #0, Down-Counter Timer #1, . . . and Down-Counter Timer #N, as identified by reference numeral 271, 272, . . . and 273 respectively.

In the preferred embodiment as outlined in FIG. 2, the Arbiter 240 comprises a Control Unit 250, a Counter Array 270, and a Bus Elector 260. The Counter Array 270 has a total of N Down-Counter Timers 271, 272, . . . and 273, each of which is for a corresponding one of the N Request Agents 221, 222, . . . and 223 for controlling and managing the competition for access to the system memory bus.

The Control Unit 250, as is illustrated, is inserted between the array of Request Agents 221, 222, . . . and 223 and Counters 271, 272, . . . and 273 of the Counter Array 270. The Control Unit 250 is responsible for the timed loading of the request priority value for each Request Agent into the corresponding Down-Counter Timer in the Array. As is comprehensible for those in the art, all the functional devices of the A/V signal processing system do not issue their requests for access to the system memory block simultaneously. Rather, a request for access to memory only arises when certain processing functionality is required in the system. Thus, the Control Unit 250 exercises its managerial control of loading the request for the specific agent in the Arbiter 240, and allow the incoming request to be joined into the competition scheme in a managed and controlled manner.

For example, even though a specific request for a particular functional device of the A/V signal processing system may have a relatively higher priority than others, however, it still needs to be thrown into the arbitration mechanism for bus access contention. Though, due to the fact that it has a relatively higher priority, it then has a chance of getting ahead of other requests already engaged in the competition scheme of the Arbiter 240 and gaining access earlier than others. This allows for a latecomer with higher processing priority to get forward in the waiting queue. Without this, the overall system performance of the A/V system will be skewed away from system optimization. On the other hand, a properly-determined set of relative priorities for each and every functional device of the system, when submitted to be under control of the Arbiter 240, will allow the A/V signal processing system to perform its designed function in an optimized manner.

The Bus Elector 260, on the other hand, selects the elected Request Agent from among all the competing ones. As will be described in detail, the request agent selection is based on the relative counting status in all the Down-Counter Timers in the Counter Array 270. The selection of a request agent results in the grant of access to the memory bus to the functional device of the system represented by the elected Request Agent. As illustrated in the drawings, this selection as implemented by the Bus Elector 260 relies on the input of the counter values from each of the counters in the Counter Array 270 as well as the controlling signal issued by the Control Unit 250.

In a preferred embodiment, the Arbiter 240 runs through a preset period of time for the election of a winner from among all the requesting functional devices of the system. Each of the repeating cycles of a preset time period marks one cycle in which one bus access winner will be elected and awarded with the right to control the access to the system memory block if the memory is not locked. All incoming requests for access to system memory have to be submitted into the contention scheme in the next up-coming cycle, and this is regardless of the relative priority of the incoming requests.

In other words, an important request has to wait until the next processing cycle before it can be engaged in the competition for the access over the system memory. If its priority is relatively high, it gains forward leaps in the waiting queue and can gain access very quickly, maybe within a couple of contention cycles it can gain access. On the other hand, those requests already in the processing cycle but with lower priority will be pushed backward in the queue if there ever is any important request joins in the competition. As long as a request is engaged in the request agent election mechanism, it will eventually gain control over the memory bus even though its access may be delayed due to rush requests inserting forward in the queue.

Figure 3:
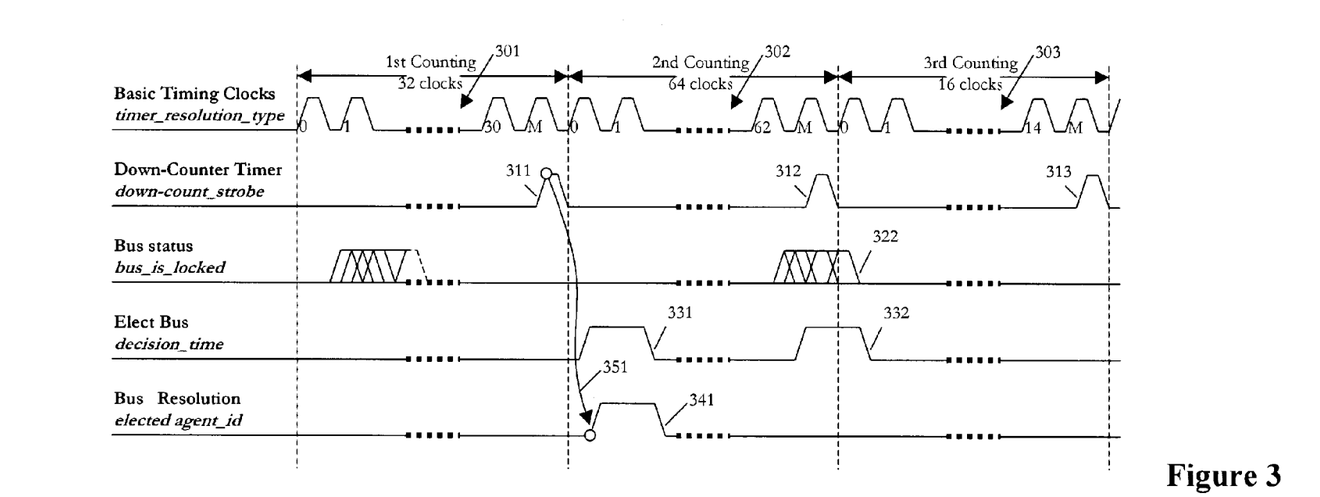
FIG. 3 is a timing diagram illustrating an exemplary timing scheme in electing a request agent corresponding to the functional devices in the system for access to the memory bus in accordance with a particular embodiment of the invention.

FIG. 3 is a timing diagram illustrating the basic timing scheme in electing a request agent for accessing the memory bus. For the counting cycle, a series of M clocks are used to time the period. In a preferred embodiment of the present invention, the value for this M can be selected with flexibility to suit the processing needs of the A/V signal processing system. For example, a parameter setting this clock value M, timer_resolution_type, can be set to one of the preset values, 0, 1, 2 or 3 for example. A corresponding logic in the Control Unit 250 of the Arbiter 240 of FIG. 2 can be employed to translate this parameter timer_resolution_type into the actual number of clocks M, which one counting cycle has to go through.

In an embodiment of the present invention, values 0, 1, 2 and 3 of this timer_resolution_type parameter can be conveniently translated into 8, 16, 32 and 64 clocks for M respectively. Specifically, the translation relationship $M=2^{(timer\_resolution\_type+3)}$ is used to set the value for M. In the example of FIG. 3, the first Counting Cycle 301 is set to 32 clocks, the second cycle 302 set to 64, and the third to 16. This exemplifies a scheme of dynamic adjustment of the counting cycle time period in order to meet the need of the A/V signal processing system. As is illustrated in the time diagram of FIG. 3, at the end of the last of the M clocks in each counting cycle, a strobe signal down-count_strobe 311, 312 and 313 for cycles 301, 302 and 303 respectively is issued to each of the Down-Counter Timer in the Counter Array 270 of the embodiment of FIG. 2. Upon reception of this strobe signal, each of the Counters 271, 272, . . . and 273 counts down by a value of 1.

Note that this M value serves as an indicator of the timer granularity. Actual value of M can be properly selected in a dynamic manner depending on the activity level of the system memory bus. This control parameter can be user-definable, and, in a preferred embodiment of the present invention, can be set in the Control Register 210 of the memory bus Arbitration Controller 200 of FIG. 2. In general, the more activity by a Request Agent on the system DRAM bus, the higher the value of M can be assigned.

When the DRAM Main Controller 230 of the Arbitration Controller 200 (FIG. 2) issues a one-clock-cycle signal, decision_time, the Arbiter 240 first checks to see if the memory resource of the system is locked by an on-going session. If not, the Arbiter 240 then compares all the counter values in those down-counter timers containing active requests.

As is illustrated in the time diagram of FIG. 3, when the DRAM Main Controller 230 issues its decision_time signal 331 during the second Counting Cycle 302, the bus status signal bus_is_locked is inactive. The condition that the system memory bus is freely available for access to any requesting functional device of the system allows the resolution to proceed onward. Thus, among the compared counter values, the Request Agent with the smallest counter value is awarded with the DRAM bus access by the Bus Elector 260. As is illustrated, the Bus Elector 260 can then issue its winner identification information, elected_agent_id to the DRAM Main Controller 230.

In case of a tie (two or more of the counters bear the same smallest counter value), the request agent with the lower index wins the bus access. For example, if Agent #3 and #5 have the same counter countdown value, Agent #3 can be the one gaining control. However, as is comprehensible for those skilled in the art, a different scheme of selecting the higher indexed agent to resolve the tie is also applicable.

On the other hand, if the bus_is_locked signal is active to signify the fact that the system memory is under certain locked session, the resolution of a bus winner is suspended. For example, as is illustrated in the time diagram of FIG. 3, before the conclusion of the second Counting Cycle 302 when the DRAM Main Controller 230 issues its signal decision_time 332, the bus-usage status signal bus_is_locked as maintained by the Control Unit 250 is in its active status. This forces the Bus Elector 260 to abort its resolution (release) of a new bus winner. Thus, this locking mechanism only allows for a single Request Agent to gain the DRAM bus control for an extended period of time without interruption. This is necessary for some of the signal processing requirements common in an A/V signal processing system.

Figure 4:
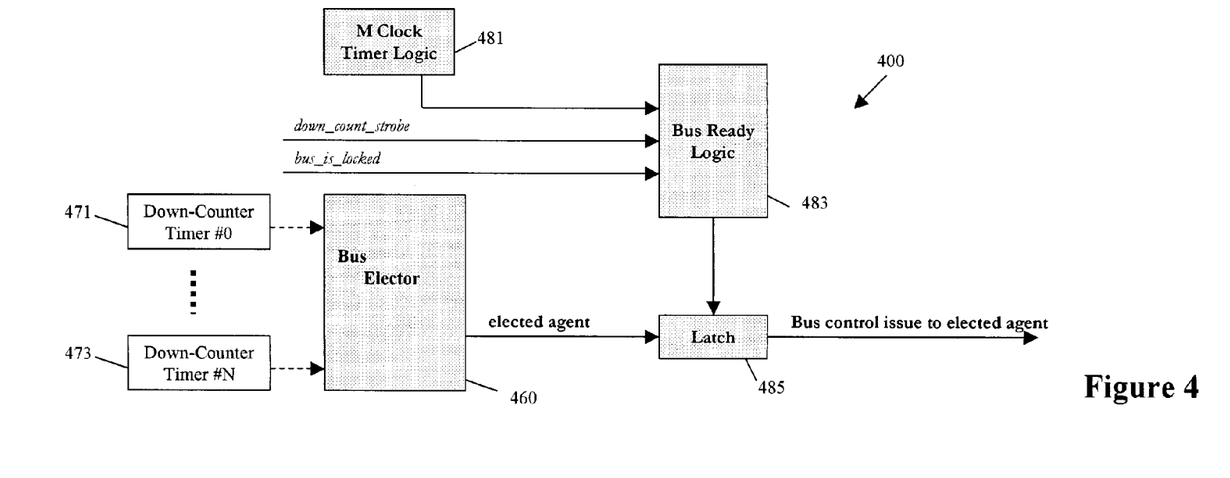
FIG. 4 is a block diagram illustrating an embodiment of a bus release mechanism for the memory bus arbitration controller shown in FIG. 2.

FIG. 4 is a block diagram of an embodiment of a Bus release Mechanism 400 that can be implemented for the memory bus Arbitration Controller 200 of FIG. 2. As shown, a Bus Ready Logic 483 can be employed to control the release of the bus winner's access right as resolved by the Bus Elector 260 of FIG. 2, here designated as Selector 460. In this embodiment, the Bus Elector 460 is allowed to resolve a candidate of winner regardless of the bus-usage status. This way, the logic circuit required for the Selector 260 (460) can be implemented in simple manner.

In the example, the Bus Ready Logic 483 can take into account for its decision concerning whether or not to allow the Latch 485 to release the resolved bus winner candidate to the DRAM Main Controller of FIG. 2. If the release is in order, the candidate winner becomes the bus winner as it is released for gaining control over the system memory resource. Otherwise, it is an unreleased candidate, and the memory resource can remain locked for other use.

The Bus release Mechanism 400 of FIG. 4 may employ several inputs to reach to its decision of winner candidate release. As shown, the bus status signal bus_is_locked constitutes one controlling factor. If it is decided that the bus needs to be remained under control for other purposes, the Release Mechanism 400 must then decide not to allow the release of the winner candidate.

On the other hand, the signal that signifies the start (or end) of a counting cycle for the Down-Counter Timers in the Counter Array (270 of FIG. 2) of the Arbiter, down-count_strobe, can also be utilized as a controlling factor for timing the release of the resolved bus winner. Bus release timing control may, in some occasions, be necessary to implement optimized control in the overall A/V signal processing system. For example, since election of a new bus winner leads to the switchover of the bus access right from one functional device of the system to another, it may, in some occasions, be necessary to allow for the conclusion (at least temporarily) of the currently on-going memory access by one functional device that is of lower priority. These interruptions must be managed properly so that they can be picked up again later and be resumed smoothly.

For example, as is illustrated in the time diagram of FIG. 3, leading edge of the strobe signal down-count_strobe 311, along with other signals, may be used to produce a positive result on the output of the Bus Ready Logic 483, which in turn triggers the Latch 485 to release its latched winner candidate. The latch-released elected_agent_id may then be relayed back to the DRAM Main Controller (230 of FIG. 2) of the Arbitration Controller (200).

Also, the basic timing logic of the system, illustrated in the Bus release Mechanism 400 of FIG. 4 as the M Clock Timer Logic 481, may be providing the basic timing signals for the operation of the Bus Ready Logic 483. As described, this connection to the basic system timing signal allows for more organized and sound control of the memory bus switchover in a smooth manner among the requesting resources of the system.

Figure 5:
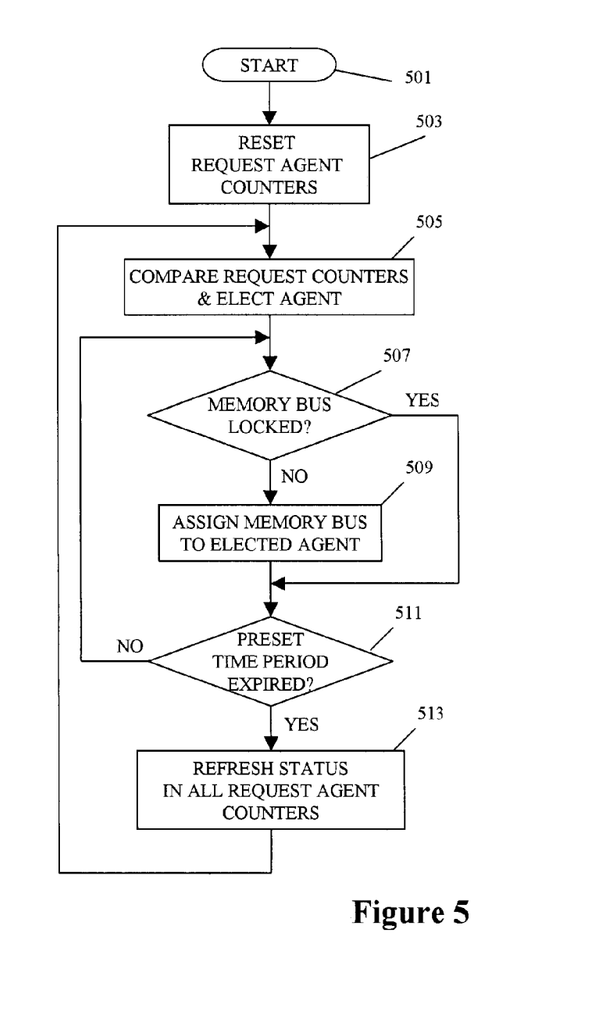
FIG. 5 is a flow diagram illustrating a memory bus assignment methodology in accordance with a preferred embodiment of the invention.

FIG. 5 is a flowchart illustrating a bus arbitration scheme in accordance with a preferred embodiment of the present invention. Such a bus arbitration scheme can be implemented on an A/V signal processing system such as depicted in FIG. 1 that employs the arbitration controller of FIG. 2.

For the management of memory bus access right assignment among the various functional devices of the A/V system of FIG. 1, each of the functional devices raises its respective request for access to the system memory block through its assigned Request Agent (FIG. 2). As the bus arbitration scheme is launched at step 501 in the A/V system after the system is brought up, all Down-Counter Timers corresponding to each of the Request Agents are reset at step 503. Reset of these counters involves, as described above, loading into the Control Register 210 the set of priority grading information req_0_max-lat, req_1_max-lat, . . . and req_N_max-lat for each of the functional devices represented by the Request Agents 221, 222, . . . and 223 respectively.

Then, as the Arbitration Controller 200 is performing normally, Arbiter 240, under a timed scheme, compares the content of all the counters and resolve a bus winner accordingly at step 505. Note that in the timed scheme that steers the arbitration for bus access assignment among all the competing functional devices of the system, different priority weights for each of the sections are reflected in their respective preset priority grading values. As mentioned above, the governing system also allows for the dynamic adjustment of these priorities on-the-fly as the system functional requirement is altered.

As a result of comparison conducted in step 505, if a winner is resolved from among all the competing Agents, the scheme then checks the usage status of the memory bus at step 507. If the bus is not locked for certain on-going memory access by some high-priority session, the scheme may then proceed to step 509 to effect the assignment of the bus access to the resolved winner. After granting the access and actually transferring memory bus control over to the winner, the scheme then proceeds to step 511.

If, on the other hand, the checking step 507 decides that the bus is currently locked by a session, the scheme then jumps to step 511. At step 511, the scheme examines to see if a preset time period has expired. If not, the scheme holds until the expiration. This holding time is to ensure that a winner gaining control over the memory resource can enjoy a minimum chunk of time period to implement its function in the system memory block. Length of this minimum time period depends on different designs of the A/V system itself. In general, optimization of the A/V system performance requires a corresponding optimized holding time period in step 511.

Holding time ensured by step 511 is necessary regardless of the test result of step 507. If step 507 shows that the bus is locked for an on-going session by certain functional device of the system, it does need the ensured minimum time period to implement its task. If step 507 shows that the bus is not under locked session and a new winner gains control, the new winner also needs the same ensured minimum time period for itself Then, if the testing step 511 indicates that the preset time period has expired, and whichever elected functional device of the system gaining access to the system memory resource has expired its share of time chunk, the scheme then transfers to step 513 to refresh status in all request agent counters. Then, the scheme may return back to step 505 to restart another bus arbitration cycle.

In the scheme of FIG. 5, since each Request Agent is represented by its own preset grading value of different weight, therefore the Arbitration Controller implementing the scheme may effect a reasonable, smooth and efficient distribution of system memory resource among all the competing functional devices.

Figure 6:
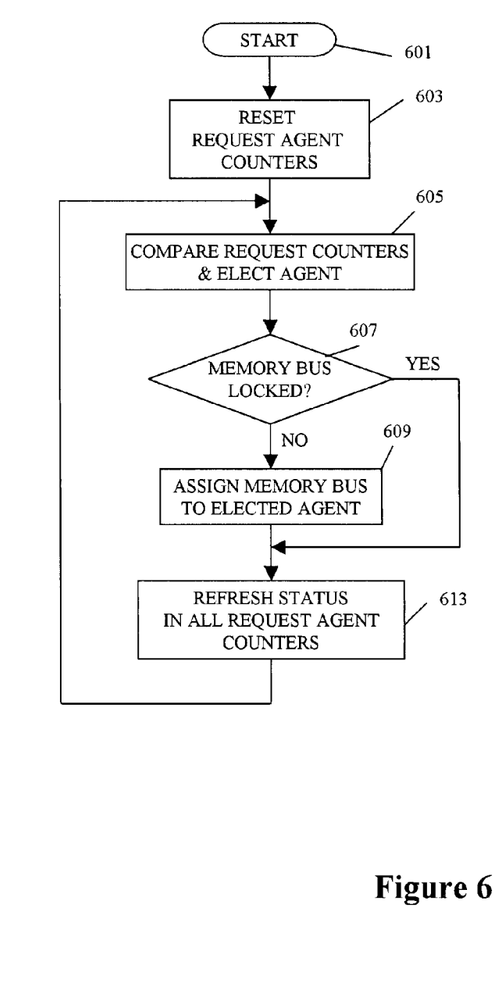
FIG. 6 is a flow diagram illustrating a memory bus assignment methodology in accordance with another embodiment of the invention.

FIG. 6 is a flowchart illustrating a bus arbitration scheme in accordance with another embodiment of the present invention. The arbitration scheme of FIG. 6 is basically the same as that described in FIG. 5 except for the difference that the action to reserve a holding time to ensure the minimum time period for each memory resource gaining winner is not implemented. This does not affect the overall system performance due to uncontrolled bus access time period lent to different competing functional devices of the system. The timing control can still be implemented by, for example, controlling the basic counting cycle as described in the time diagram of FIG. 3.

As described in FIG. 4, the Bus release Mechanism 400 can participate in this time period control via cooperation between the Bus Ready Logic 483 and the M Clock Timer Logic 481. The optimized time period to be assigned to every winner can be controlled by adjusting the M value. As described above, this can be implemented by setting the corresponding value in the Control Register 210 of the Arbitration Controller 200.

For a request agent that issued its request earlier and has successfully gained bus access, its associated counter is reset to its assigned maximum latency parameter value. This means that the very requesting functional device of the system has just been awarded the bus control, and the next time when it needs to request again, it must start with its maximum latency value. This ensures the even and fair sharing of the memory resource of the A/V signal processing system among all the functional devices of the system.

Although the invention has been described with reference to the preferred embodiments, it will be understood that the invention is not limited to the details described thereof. Substitutions and modifications have been suggested in the foregoing description, and others will occur to those of ordinary skill in the art. In particular, the process steps of the method according to the invention will include methods having substantially the same process steps as the method of the invention to achieve substantially the same result. Therefore, all such substitutions and modifications are intended to be within the scope of the invention as defined in the appended claims and their equivalents.

We claim:

1. A method of managing a memory bus, the method comprising:

receiving a first memory access request from a first request agent that represents a first functional device and a second memory access request from a second request agent that represents a second functional device;

loading a first access priority value into a first counter timer, wherein the first access priority value corresponds to a processing function that is provided by the first functional device;

loading a second access priority value into a second counter timer, wherein the second access priority value corresponds to a different processing function that is provided by the second functional device;

loading a timer resolution parameter into a control register, wherein the timer resolution parameter relates to an amount of time associated with a first counting cycle of the first counter timer and a second counting cycle of the second counter timer;

dynamically adjusting a plurality of priority access values that includes the first priority access value and the second priority access value, wherein the plurality of priority access values are stored in the control register; and dynamically adjusting the timer resolution parameter based on the activity level of the memory bus;

wherein the first functional device accesses the memory bus before the second functional device when the first access priority value represents a higher priority than the second access priority value; and wherein the second functional device accesses the memory bus before the first functional device when the second access priority value represents a higher priority than the first access priority value.

2. The method of claim 1, wherein a bus elector compares the first access priority value to the second access priority value.

3. The method of claim 1, wherein the first access priority value represents the higher priority when the first access priority value is greater than the second access priority value.

4. The method of claim 1, wherein the first access priority value represents the higher priority when the first access priority value is lower than the second access priority value.

5. The method claim 4, further comprising:
starting a first clock cycle when the first functional device accesses the memory bus; and
decrementing the second access priority value after the first clock cycle has expired.

6. The method of claim 5, further comprising:
receiving a third memory access request from a third request agent that represents a third functional device;
loading a third access priority value into a third counter timer, wherein the third access priority value corresponds to another processing function that is provided by the third functional device;
wherein the second functional device has priority access to the memory bus when the decremented second access priority value represents a higher priority than the third access priority value; and
wherein the third functional device has priority access to the memory bus when the third access priority value represents a higher priority than the decremented second access priority value.

7. The method of claim 6, further comprising:
decrementing the third access priority value, when the second functional device accesses the memory bus and a second clock cycle ends;
receiving a next memory access request from the second request agent;
resetting the decremented second access priority value to the second access priority value;
wherein the second functional device has priority access to the memory bus when the second access priority value represents a higher priority than the decremented third access priority value; and
wherein the third functional device accesses the memory bus when the decremented third access priority value represents a higher priority than the second access priority value.

8. The method of claim 1, further comprising:
determining whether the memory bus is locked; and
preventing the first functional device and the second functional device from accessing the memory bus when the memory bus is locked.

9. The method of claim 1, wherein the amount of time associated with the first counting cycle is the same as the amount of time associated with the second counting cycle.

10. The method of claim 1, further comprising:
loading a first timer resolution parameter into the control register, the first timer resolution parameter corresponding to a first amount of time associated with the first counting cycle; and
loading a second timer resolution parameter into the control register, the second timer resolution parameter corresponding to a second amount of time associated with the second counting cycle;
wherein the first timer resolution parameter relates to an amount of activity by the first functional device on the system bus and the second timer resolution parameter relates to an amount of activity by the second functional device on the system bus.

11. A system to manage a memory bus, the system comprising:
a memory bus configured to communicate with a first functional device that provides a first processing function and with a second functional device that provides a second processing function;
wherein the first functional device is represented by a first request agent and the second functional device is represented by a second request agent;
a control register configured to store a first access priority value associated with the first request agent, a second access priority value associated with the second request agent, and a timer resolution parameter;
wherein the first access priority value corresponds to the first processing function and the second access priority value corresponds to the second processing function;
wherein the control register is configured to dynamically adjust a plurality of priority access values that includes the first priority access value and the second priority access value in response to a user request and to dynamically adjust the timer resolution parameter based on the activity level of the memory bus;
wherein the timer resolution parameter relates to an amount of time associated with a first counting cycle of the first counter timer and a second counting cycle of the second counter timer;
a control unit configured to load the first access priority value into a first counter timer when the first request agent issues a first memory access request, and to load the second access priority value into a second counter timer when the second request agent issues a second memory access request;
wherein the first functional device accesses the memory bus before the second functional device when the first access priority value represents a higher priority than the second access priority value; and
wherein the second functional device accesses the memory bus before the first functional device when the second access priority value represents a higher priority than the first access priority value.

12. The system of claim 11, wherein the first memory access request and the second memory access request are received by a bus arbiter.

13. The system of claim 11, further comprising a bus elector coupled to the first counter timer and the second counter timer, wherein the bus elector is configured to compare the first access priority value to the second access priority value.

14. The system of claim 11, wherein the first functional device and the second functional device are included within a moving picture experts group (MPEG) video codec processor.

15. The system of claim 11, further comprising a control unit coupled to the request agents for respectively receiving corresponding requests for access to the memory bus.

16. The system of claim 11, wherein the first functional device and the second functional device are selected from a group consisting of memory controllers, image processors, motion estimation processors, and host/peripheral interfaces.

17. The system of claim 11, wherein the first access priority value represents a first maximum latency count and the second access priority value represents a second maximum latency count.

18. The system of claim 11, further comprising a plurality of clocks that time a clock cycle when the memory bus is accessed.

19. The system of claim 18, further comprising a bus release mechanism, wherein the plurality of clocks begin the clock cycle when the bus release mechanism releases the first functional device or the second functional device to access the memory bus.

20. The system of claim 18, further comprising a bus release mechanism, wherein the bus release mechanism releases the first functional device or the second functional device to access the memory bus alter at least one of the plurality of clocks begin to time the clock cycle.

* * * * *

UNITED STATES PATENT AND TRADEMARK OFFICE
CERTIFICATE OF CORRECTION

| | |
|---|---|
| PATENT NO. | : 7,284,080 B2 |
| APPLICATION NO. | : 10/614676 |
| DATED | : October 16, 2007 |
| INVENTOR(S) | : Chin-Long Lin et al. |

Page 1 of 1

It is certified that error appears in the above-identified patent and that said Letters Patent is hereby corrected as shown below:

TITLE PAGE, ITEM (22) FILED: Filing Date "Jul. 4, 2003" should be changed to --Jul. 7, 2003--.

Signed and Sealed this

Fifteenth Day of April, 2008

JON W. DUDAS
*Director of the United States Patent and Trademark Office*